United States Patent [19]
Behnke

[11] 3,836,268
[45] Sept. 17, 1974

[54] SWIVEL ASSEMBLY
[75] Inventor: Arnold F. Behnke, Rosemead, Calif.
[73] Assignee: Kay-Brunner Steel Products, Inc., Los Angeles, Calif.
[22] Filed: Mar. 26, 1973
[21] Appl. No.: 344,590

[52] U.S. Cl. .................................. 403/165, 308/35
[51] Int. Cl. ......................... F16c 17/00, B25c 3/18
[58] Field of Search ........ 403/78, 164, 165; 308/35, 308/176

[56] References Cited
UNITED STATES PATENTS
501,790   7/1893   Jacobs .............................. 308/176
2,487,085  10/1949  Wridge .............................. 403/164

Primary Examiner—Charles J. Myhre
Assistant Examiner—Frank Susko
Attorney, Agent, or Firm—Sellers and Brace

[57] ABSTRACT

A swivel assembly adapted for use under tension and comprising a flanged rotor sealed within a cup-shaped housing along with a combined thrust and radial bearing unit held assembled by self-locking keeper means. The thrust bearing is maintained preloaded under conditions effective to retain the components locked against disassembly.

10 Claims, 1 Drawing Figure

PATENTED SEP 17 1974　　　　　　　　　　　3,836,268
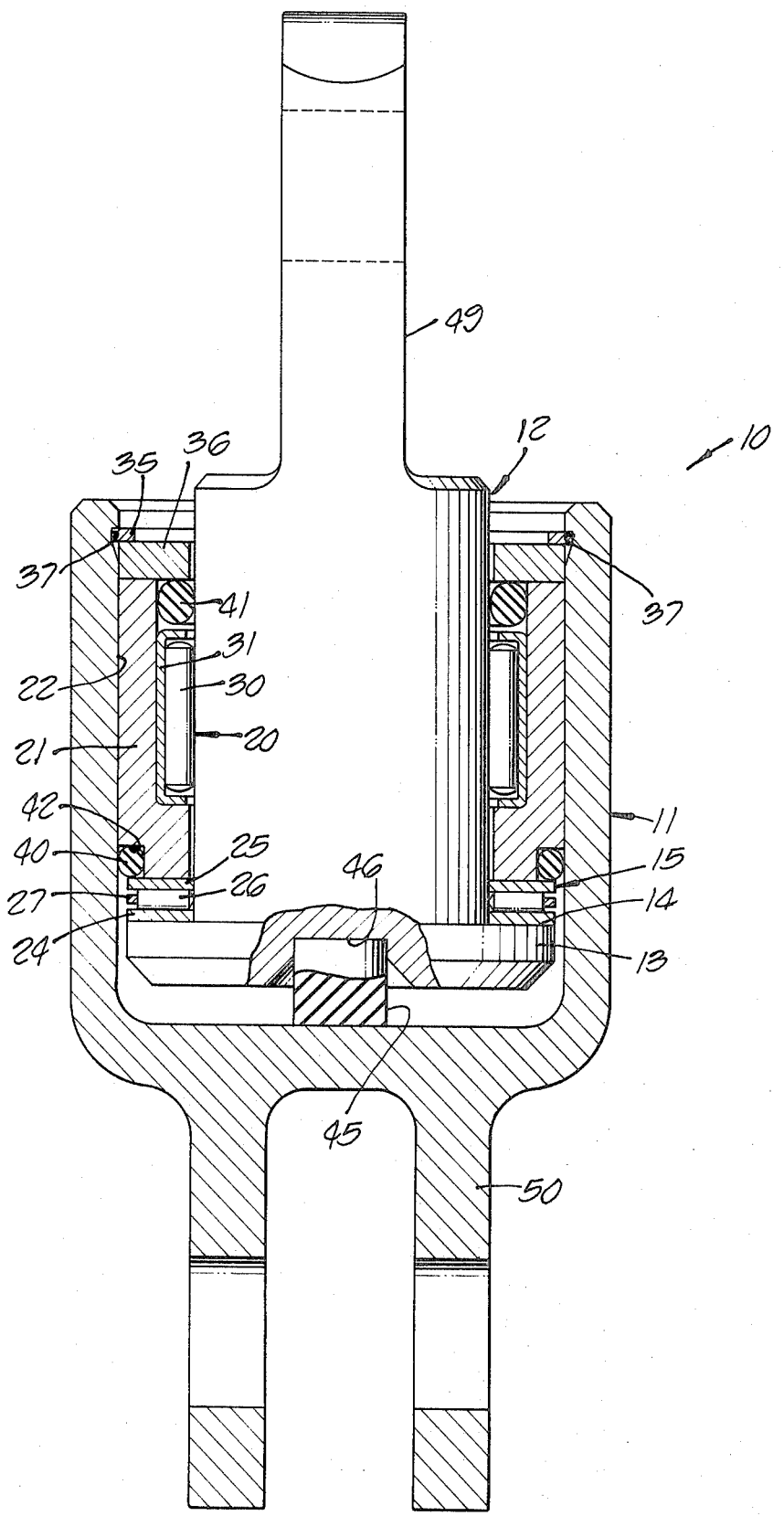

SWIVEL ASSEMBLY

There is provided by this invention a simple, rugged sealed swivel assembly having a flanged rotor enclosed within a cup-shaped housing by a combined thrust and radial bearing unit held assembled by self-locking retainer means. The very compact antifriction bearing unit is interposed between the rotor flange and the retainer ring, the latter being shaped to fit against the I.D. of a split ring keeper partially seated in an inwardly opening groove formed in the sidewall of the main housing. Spring means interposed between the bottom of the housing and the adjacent inner end of the rotor not only maintains the thrust bearing preloaded but holds the retainer ring in locking position radially opposite the keeper ring. The parts can be disassembled for inspection and servicing by compressing the preloading spring thereby unloading the thrust bearing and permitting the retainer ring to move out of interference with the keeper. The bearing assembly utilizes inner and outer O-rings for sealing the assembly closed against entrance of foreign matter and retaining the lubricant captive. The opposite ends of the assembly preferably include tongue and clevis means for use in installing the swivel in an operating environment.

It is therefore an object of this invention to provide a compact high strength swivel assembly having a combined thrust and radial bearing.

Another object of the invention is the provision of a swivel assembly having means for preloading the bearing assembly and locking the components against disassembly.

Another object of the invention is the provision of a sealed swivel assembly provided with resilient means normally locking the components assembled.

Another object of the invention is the provision of a swivel assembly wherein a rotor is retained in a cup-shaped housing by a spring keeper across which the load forces are transmitted in shear by a pressure ring aiding in holding the keeper against disassembly.

These and other more specific objects will appear upon reading the following specification and claims and upon considering in connection therewith the attached drawing to which they relate.

Referring now to the drawing in which a preferred embodiment of the invention is illustrated:

The drawing is a longitudinal cross-sectional view through an illustrative embodiment of the swivel assembly.

Referring to the drawing, there is shown a swivel assembly designated generally 10 embodying the features of this invention. The assembly includes a cup-shaped main housing 11 rotatably supporting a rotor 12. The inner end of the rotor is provided with an annular flange 13 having a radial load supporting surface 14 for a thrust bearing 15. A radial bearing unit 20 embraces the cylindrical body of rotor 12 and housed within a shouldered ring 21 having a close sliding fit with the interior sidewall 22 of the main housing.

Thrust bearing 15 includes a pair of hardened race rings 24,25 between which are supported a plurality of needle or roller bearings 26, these bearing being held spaced apart by a cage ring 27 of well known construction. Race ring 24 rests directly against surface 14 of flange 13 whereas race ring 25 bears against the inner end of ring 21.

Radial bearing 20 comprises a plurality of roller bearings 30 held captive within a race ring 31 having a press fit against the inner sidewall of ring 21.

The antifriction bearings 15,20 are held assembled on rotor 12 by split spring keeper ring 35 and a pressure ring 36. The outer half of keeper 35 is seated in an annular groove 37 opening inwardly from the side wall of housing 11. Keeper 35 is formed of high strength spring material, such as tempered stainless steel or high carbon steel coated to resist corrosion. Pressure ring 36 is positioned between bearing unit 20 and the adjacent surface of keeper 35 and transfers the load forces acting on the latter to keeper 35 and main housing 11. Assurance is thereby provided that the keeper will be loaded in shear transversely thereof in a cylindrical envelope coincident with the interior sidewall 22 of housing 11.

All interior surfaces are in need of lubrication and a suitable lubricant is held captive within the assembly by a pair of O-rings 40,41. Ring 40 is seated in an annular groove 42 at the inner end of ring 21 and is under radial compression between the interior sidewall of the housing and the bottom of groove 42. Likewise, sealing ring 41 is under radial compression between the interior of ring 21 and the sidewall of rotor 12.

A feature of the swivel assembly is the provision of resilient means, such as a cylinder of elastomer 45 or a coil spring, having one end seated in a well 46 of rotor 12 and its other end bearing against the bottom of housing 11. In the assembled position of the swivel the cylinder of elastomer 45 is under axial compression thereby preloading thrust bearing 15 against the inner end of ring 21. This preload pressure on the thrust bearing also loads ring 21 against the pressure ring 36 and aids in holding keeper ring 35 snugly assembled in groove 37.

Disassembly of the swivel is accomplished by pressing rotor 12 inwardly axially of housing 11 to compress elastomer 45 sufficiently to facilitate release of pressure ring 36 out of its seating groove 37. Keeper 35 may then be contracted in known manner off seat 37 so that both of the keeper and pressure rings 35 can be removed. Thereafter, the rotor and bearing assembly can be withdrawn from the housing. Reassembly of the parts is accomplished in reverse order, the preloading member 45 being held compressed so that keeper 35 can be installed in groove 37.

As herein shown, the rotor, housing and keeper are formed of stainless steel. Rotor 12 is shown as provided with a perforated tongue 49 and the rear end of housing 11 is provided with a clevis 50 for convenience in connecting the swivel assembly to operating environment components.

The following test data is illustrative of the load handling capability of the swivel assembly with a main housing member having an O.D. of 2.75 inches and a wall thickness of 0.25 inch, a keeper ring 35 having a cross-sectional diameter of 75 mils seated in groove 37 having a depth of 37 mils. The swivel was found to have a tensile load capacity of 5,000 lbs, and a yield strength of 21,500 lbs. The swivel was tested to destruction in an Atlas testing tool and broke under a straight tensile pull of 33,500 lbs. Failure occurred due to expansion of the housing in the area adjacent keeper spring 35.

While the particular swivel assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A swivel assembly for a tensile load acting axially thereof comprising: a radially flanged cylindrical rotor having a thrust bearing portion and a cylindrical portion, a cup-shaped housing enclosing said rotor, means including combination thrust and radial anti-friction bearing means holding said rotor and housing assembled with said radial flange seated against the thrust bearing portion thereof and the cylindrical portion of said rotor embraced by the radial portion of said bearing means, and split ring keeper means holding the components of said swivel assembly assembled to one another, said keeper means being resiliently seated in an annular groove opening inwardly through the interior surface of said housing sidewall with an inner portion thereof in contact with the adjacent outer end of said bearing means thereby loading said keeper means in cylindrical shear coincident to the interior sidewall surface of said housing.

2. A swivel assembly as defined in claim 1 characterized in the provision of resilient means loaded in compression axially of said housing between the interior bottom thereof and the adjacent end of said rotor thereby to maintain said thrust bearing means preloaded.

3. A swivel assembly as defined in claim 1 characterized in the provision of detachable keeper means holding the components of said swivel assembly normally loaded against disassembly, and resilient means normally maintaining said rotor under a predetermined thrust load.

4. A swivel assembly as defined in claim 3 characterized in that said keeper means includes a split ring seated in an inwardly opening annular groove in the interior sidewall of said housing, and a pressure ring having a portion thereof bearing against said split ring.

5. A swivel assembly as defined in claim 3 characterized in the provision of seal means bearing against the exterior of said rotor and against the interior sidewall of said housing to maintain lubricant captive within said assembly.

6. A swivel assembly comprising a rotor, a surrounding sleeve, a bearing sub-assembly interposed between said rotor and sleeve, retainer means for locking said rotor and sleeve assembled including a split ring keeper normally seated in an inwardly opening groove formed in the inner sidewall of said sleeve, pressure ring means having one face thereof bearing against said keeper, said bearing sub-assembly being positioned against one axial face of said pressure ring means, and resilient means interposed between said rotor and sleeve.

7. A swivel assembly as defined in claim 6 characterized in that said resilient means is formed essentially of elastomeric material.

8. A swivel assembly as defined in claim 6 characterized in that said sleeve is closed at one end, said resilient means being positioned between the closed end of said sleeve and the adjacent inner end of said rotor, and said pressure ring means and said keeper being located adjacent the opposite end of said sleeve.

9. A swivel assembly for a tensile load acting axially thereof comprising: a radially flanged cylindrical rotor having a thrust bearing portion and a cylindrical portion, a cup-shaped housing enclosing said rotor, means including combination thrust and radial anti-friction bearing means holding said rotor and housing assembled with said radial flange seated against the thrust bearing portion thereof and the cylindrical portion of said rotor embraced by the radial portion of said bearing means, and resilient seal means interposed between said rotor and said cup-shaped housing and cooperating therewith to exclude moisture and foreign matter from said combination thrust and radial bearing means and to retain a charge of lubricant captive within said cup-shaped housing.

10. A swivel assembly as defined in claim 9 characterized in that said bearing means utilizes a plurality of rollers to carry both thrust and radial load forces.

* * * * *